Aug. 9, 1955     W. STONE, JR     2,714,721
ARTIFICIAL CORNEAL IMPLANTS
Filed Jan. 23, 1953
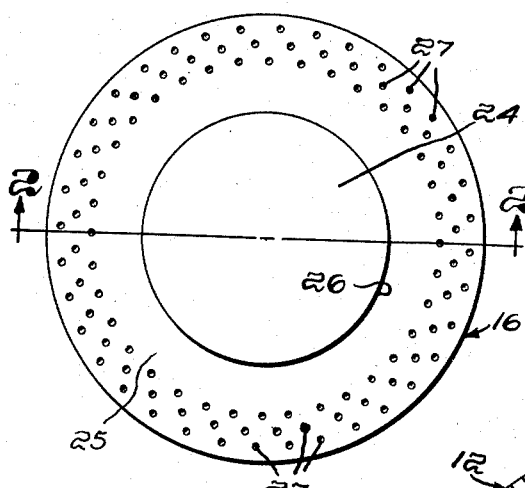
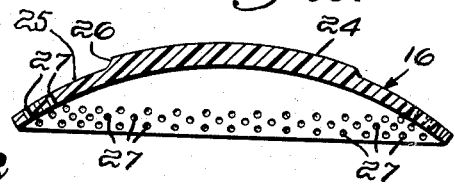
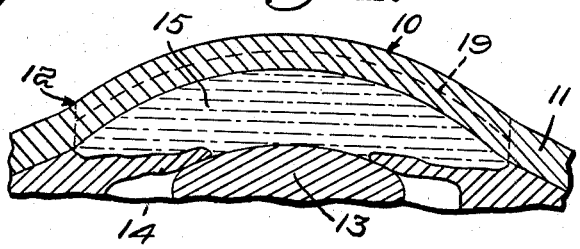
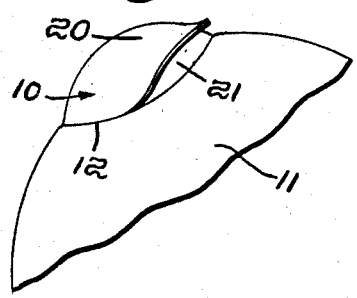
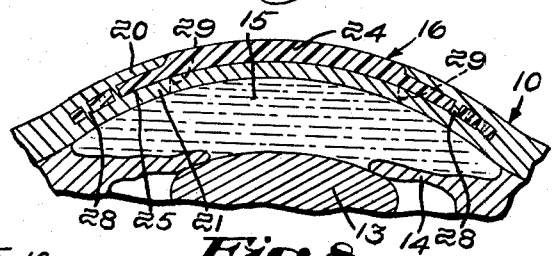
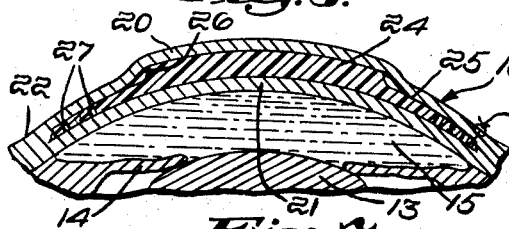
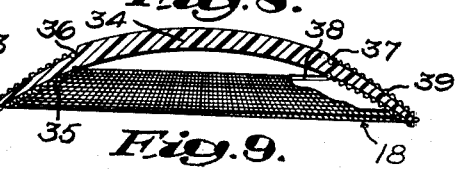
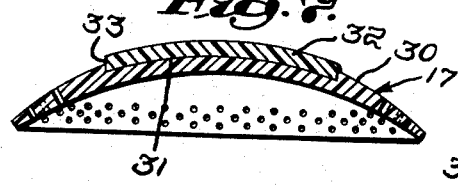
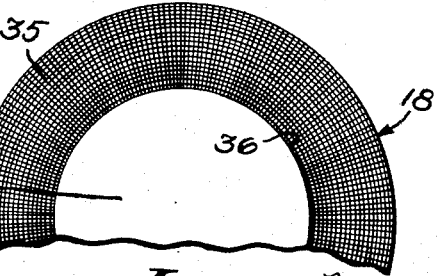
Inventor:
William Stone, Jr.
by Abbott Spear
Attorney United States Patent Office 2,714,721
Patented Aug. 9, 1955

2,714,721

ARTIFICIAL CORNEAL IMPLANTS

William Stone, Jr., Cambridge, Mass.

Application January 23, 1953, Serial No. 332,879

8 Claims. (Cl. 3—1)

This invention relates to artificial corneal implants adapted to be anchored in place by the ingrowth of corneal stroma.

There are, in the United States, some 36,000 totally blind and between 60,000 and 70,000 partially blind persons due to corneal opacification. In addition, there are approximately 2,600 eyes that become partially or completely blind each year from that cause with close to a half of those cases being due to chemical and physical injury and the sequelae of foreign bodies.

While the technique of making corneal transplants from eyes stored in so-called "eye banks" is highly developed, successful operations are decidedly in the minority. Such operations are less than thirty (30) percent successful and the most reliable figures available indicate that in only sixteen (16) percent of the cases was there any improvement in visual acuity. The reasons for failures are due, in great part, to clouding of the graft and ingrowth of vessels and these have suggested the desirability of providing an artificial graft into which the vessels could not grow and which could not cloud.

Various attempts have been made to provide such grafts in the form of windows. In these attempts, various transparent materials have been used but even when these were sufficiently inert to be tolerated by the stroma, the grafts, although sutured in place, soon extruded.

The general objective of this invention is to provide an artificial graft in the form of a corneal implant at least the central part of which is transparent and the marginal part of which is provided with a multiplicity of pockets. The implant is of thin concavo-convex form and adapted to be inserted between surgically established corneal layers and anchored in place by the ingrowth of the stroma into the pockets during the period when the sutured closure of the incision is effective to maintain the corneal stroma in contact with the implant. After such ingrowth, the anterior corneal layer and sometimes the posterior corneal layer as well is trephined.

In the accompanying drawings, there are shown illustrative embodiments of the invention from which these and other of its objectives, novel features, and advantages will be readily apparent.

In the drawings:

Fig. 1 is an elevational view, on an enlarged scale, of an implant in accordance with the invention.

Fig. 2 is a section along the indicated lines 2—2 of Fig. 1.

Fig. 3 is a perspective and fragmentary view of an eyeball having its cornea divided into interconnected anterior and posterior layers to receive an implant in accordance with the invention.

Fig. 4 is a fragmentary horizontal section of the corneal area of the eyeball on substantially the scale of Figs. 1 and 2.

Fig. 5 is a sectional view with the implant sutured between the corneal layers.

Fig. 6 is a view similar to Fig. 5, but suggesting the ingrowth of stroma and showing the trephined anterior corneal layer.

Figs. 7 and 8 are views generally similar to Fig. 2 but illustrating other embodiments of the invention, and Fig. 9 is a fragmentary elevational view of the embodiments of the invention shown in Fig. 8.

In order that the invention may be readily understood, reference is made to the fact that a cornea 10 protrudes somewhat from the regular contour of the remainder of the eyeball, generally indicated at 11, with the junction therebetween being termed the "limbus" and designated at 12. Other parts of the eyeball 11 that are shown are the lens 13, the iris 14, and the anterior chamber 15.

Before detailing the implant 16 of Figs. 1, 2, 5, and 6, the implant 17 shown in Fig. 7, and the implant 18 illustrated by Figs. 8 and 9, it is to be noted that each is relatively thin and of concavo-convex form thus to approximate the contour of the affected cornea. To accommodate an implant in accordance with the invention, such a cornea is divided by an incision, indicated at 19 in Fig. 4, starting in the zone of the limbus and separating the cornea into anterior and posterior layers 20 and 21, respectively, as may best be seen in Figs. 5 and 6, said layers remaining interconnected as at 22 in the zone of the limbus, said zone usually being diametrically opposite to the area in which the incision was started.

After the completion of the incision, the anterior layer is laid back and the implant then positioned on the posterior corneal layer 21. The layer 20 is drawn over the thus located implant and sutured as at 23 to the layer 21 thereof so that the implant is held in place between the corneal layers as suggested in Fig. 5.

Referring now to the embodiment of the invention shown in Figs. 1, 2, 5, and 6, the implant 16 is unitary and includes a central part 24 somewhat thicker than the marginal part 25, thus to provide a shoulder 26 whose height determines the thickness desired for the corneal layer 20. The outer portion of the implant part 25 is provided with a multiplicity of relatively fine holes 27.

The implant 16 may be formed from any material that is sufficiently inert to be tolerated by corneal stroma and the aqueous fluid of the anterior chamber 15 and that is suitably transparent for optical use. In practise, annealed methacrylate has proved satisfactory.

The function of the holes 27 is to provide pockets into which corneal stroma may grow, thus to anchor the implant in place. Such ingrowth is suggested at 28 in Fig. 6. It will be noted from Fig. 5 that the anterior layer 20 does not lie smoothly against the proximate face of the implant 16 due in part to the suture and in part to the presence of the shoulder 26. It does, however, lie against the outer portion of the marginal part 25, thus to ensure, during the effectiveness of the suture, that degree of contact that enables such ingrowth to occur with respect to the corneal layer 20 before the removal of the suture. Thereafter, a central portion of the corneal layer 20, and a like portion of the layer 21 if the extent of the opacification so dictates, is trephined. The portion of the posterior layer 21 that is to be thus removed is indicated at 29. Such trephining is preferably done in relation to the shoulder 26 in order that the junction between the corneal layer 20 and the central part 24 of the implant will not represent a source of irritation.

In Fig. 7, the implant 17 consists of a disc 30, generally similar to the implant 16, except that its central part is provided with a socket 31 in its outer face adapted to receive the insert 32 after the trephining of the corneal layer 20, thus to provide an external shoulder 33 having the same function as the shoulder 26 of the implant 16.

It will be apparent that it is essential that only the central part of an implant in accordance with the invention be optically clear and that, accordingly, the pockets, enabling anchorage by the ingrowth of stroma, may be variously established. As an example of different means for providing such pockets reference is made to Figs. 8 and 9 wherein the implant 18 is shown as consisting of a disc of suitably transparent and inert material whose central part 34 defines with the marginal part 35 a shoulder establishing groove 36 adapted to receive an anchoring wire ring 37. The inner face of the implant 18 is also provide with a ring receiving groove 38. The rings 37 serve to hold the screen cloth 39 in place in such relation to the proximate faces of the marginal part 35 of the implant as to provide a multiplicity of pockets. The rings and screen cloth may be of such inert metals as tantalum and vitallium.

Implants in accordance with the invention have proved successful in animal experimentation in that, for the first time, artificial corneas have been permanently grafted. The invention, accordingly, enables progress in the surgical treatment of corneal opacification to be furthered.

What I therefore claim and desire to secure by Letters Patent is:

1. A corneal implant to be located between anterior and posterior corneal layers, said implant comprising a concavo-convex disc of plastic stock that is sufficiently inert to be tolerated by corneal stroma and sufficiently clear for optical use and including a central part and marginal anchoring means comprising a marginal part having a multiplicity of holes extending from face-to-face thereof into which corneal stroma may grow and by such growing permanently anchor the implant.

2. A corneal implant to be located between anterior and posterior corneal layers, said implant comprising a concavo-convex disc of plastic stock that is sufficiently inert to be tolerated by corneal stroma and sufficiently clear for optical use and including a central part, said part defining a shoulder outlining the area of the anterior layer that is to be trephined subsequently, and said marginal part having a multiplicity of holes spaced from said shoulder and defining pockets into which corneal stroma may grow and by such growing permanently anchor the implant.

3. A corneal implant to be located between anterior and posterior corneal layers, said implant being of concavo-convex form and including an optically clear central part and marginal anchoring means including a marginal part and a screen cloth coat extending from its edge over both of its faces and anchored thereto adjacent said central part to provide a multiplicity of pockets into which corneal stroma may grow and by such growing permanently anchor the implant, said central part and said means being of stock that is sufficiently inert to be tolerated by corneal stroma, said central part and said means being disposed relative to each other to establish a shoulder on the outer face of the implant to outline the area of the anterior corneal layer that is to be trephined subsequently.

4. A corneal implant to be located between anterior and posterior corneal layers, said implant being of approximately concavo-convex form and including an optically clear central part, and marginal anchoring means having a multiplicity of pockets into which corneal stroma may grow and by such growing permanently anchor the implant, said central part and said means being of stock that is sufficiently inert to be tolerated by corneal stroma, said central part and said means being disposed relative to each other to establish a shoulder on the outer face of the implant to outline the area of the anterior corneal layer that is to be trephined subsequently.

5. A corneal implant to be located between anterior and posterior corneal layers, said implant being of approximately concavo-convex form and including an optically clear central part, and marginal anchoring means having a multiplicity of pockets into which corneal stroma may grow and by such growing permanently anchor the implant, said central part and said means being of stock that is sufficiently inert to be tolerated by corneal stroma, said central part projecting relative to said means from the outer face of said implant to establish a shoulder whose height is approximated by the thickness of the anterior corneal layer.

6. A corneal implant to be located between anterior and posterior corneal layers, said implant being of approximately concavo-convex form and including an optically clear central part, and marginal anchoring means having a multiplicity of pockets into which corneal stroma may grow and by such growing permanently anchor the implant, said central part and said means being of stock that is sufficiently inert to be tolerated by corneal stroma, said central part being recessed relative to said means to provide a socket, the resulting shoulder outlining the area of the anterior corneal layer that is to be trephined subsequently.

7. A corneal implant to be located between anterior and posterior corneal layers, said implant being of approximately concavo-convex form and including an optically clear central part, and marginal anchoring means having a multiplicity of pockets into which corneal stroma may grow and by such growing permanently anchor the implant, said central part and said means being of stock that is sufficiently inert to be tolerated by corneal stroma, said central part comprising an inner section integral with said means and recessed with reference to the outer surfaces thereof to provide a socket outlining the area of the anterior corneal layer that is to be trephined subsequently, and an outer section in the form of an insert to be set in said socket after trephining, said insert being dimensioned to establish with said means an external shoulder whose height is approximately equal to the thickness of said anterior layer.

8. A corneal implant to be located between anterior and posterior corneal layers, said implant being of concavo-convex form and including an optically clear central part and a margin, said margin being provided with a multiplicity of pockets forming anchoring portions spaced and disposed to enable the corneal stroma to grow through and around said anchoring pockets thus to permanently retain the implant, said implant being of stock that is sufficiently inert to be tolerated by corneal stroma.

References Cited in the file of this patent

UNITED STATES PATENTS 2,517,523    Batchelder _____ Aug. 1, 1950